United States Patent
Adkins et al.

(10) Patent No.: US 10,040,903 B2
(45) Date of Patent: Aug. 7, 2018

(54) POLYMER POLYOL QUALITY

(71) Applicants: Covestro LLC, Pittsburgh, PA (US); Covestro Deutschland AG, Leverkusen (DE)

(72) Inventors: Rick L. Adkins, Canonsburg, PA (US); William E. Wood, Hurricane, WV (US); Edward P. Browne, Cologne (DE)

(73) Assignees: COVESTRO LLC, Pittsburgh, PA (US); COVESTRO DEUTSCHLAND AG, Leverkusen (DE)

( * ) Notice: Subject to any disclaimer, the term of this patent is extended or adjusted under 35 U.S.C. 154(b) by 44 days.

(21) Appl. No.: 15/263,491

(22) Filed: Sep. 13, 2016

(65) Prior Publication Data

US 2018/0072846 A1   Mar. 15, 2018

(51) Int. Cl.
| | |
|---|---|
| C08F 283/06 | (2006.01) |
| C08F 290/06 | (2006.01) |
| C08G 65/333 | (2006.01) |
| B01J 19/18 | (2006.01) |
| B01J 19/24 | (2006.01) |
| C08F 2/00 | (2006.01) |
| C08G 18/63 | (2006.01) |
| C08F 2/38 | (2006.01) |
| C08F 283/00 | (2006.01) |

(52) U.S. Cl.
CPC ........ *C08G 65/33372* (2013.01); *B01J 19/18* (2013.01); *B01J 19/24* (2013.01); *C08F 2/002* (2013.01); *C08F 2/38* (2013.01); *C08F 283/008* (2013.01); *C08F 283/06* (2013.01); *C08F 283/065* (2013.01); *C08F 290/062* (2013.01); *C08F 290/067* (2013.01); *C08G 18/632* (2013.01); *C08G 18/635* (2013.01); *C08J 2471/00* (2013.01)

(58) Field of Classification Search
None
See application file for complete search history.

(56) References Cited

U.S. PATENT DOCUMENTS

| | | |
|---|---|---|
| 3,073,788 A | 1/1963 | Hostettler et al. |
| 3,953,393 A | 4/1976 | Ramlow et al. |
| 4,119,586 A | 10/1978 | Shah |
| 4,148,840 A | 4/1979 | Shah |
| 4,242,249 A | 12/1980 | Van Cleve et al. |
| 4,463,107 A | 7/1984 | Simroth et al. |
| 4,521,546 A | 6/1985 | O'Connor et al. |
| 4,883,832 A | 11/1989 | Cloetens et al. |
| 5,196,476 A | 3/1993 | Simroth |
| 5,324,774 A | 6/1994 | Nishikawa et al. |
| 5,364,906 A | 11/1994 | Critchfield et al. |
| 5,814,699 A | 9/1998 | Kratz et al. |
| 5,990,185 A | 11/1999 | Fogg |
| 6,013,731 A | 1/2000 | Holeshovsky et al. |
| 6,455,603 B1 | 9/2002 | Fogg |
| 6,624,209 B2 | 9/2003 | Kawamoto et al. |
| 7,179,882 B2 | 2/2007 | Adkins et al. |
| 7,977,501 B2 | 7/2011 | Haider et al. |
| 8,134,022 B2 | 3/2012 | Haider et al. |
| 8,461,285 B2 | 6/2013 | Ahmadnian et al. |
| 8,933,192 B2 | 1/2015 | Guertler et al. |
| 8,946,466 B2 | 2/2015 | Guertler et al. |
| 9,045,592 B2 | 6/2015 | Guertler et al. |
| 9,062,156 B2 | 6/2015 | Guertler et al. |
| 9,080,010 B2 | 7/2015 | Wolf et al. |
| 9,228,054 B2 | 1/2016 | Mueller et al. |
| 9,260,562 B2 | 2/2016 | Mueller et al. |
| 9,309,356 B2 | 4/2016 | Mueller et al. |
| 9,315,622 B2 | 4/2016 | Hofmann et al. |
| 9,382,417 B2 | 7/2016 | Guertler et al. |
| 2011/0306728 A1 | 12/2011 | Adkins et al. |
| 2012/0041144 A1 | 2/2012 | Adkins et al. |
| 2013/0131204 A1 | 5/2013 | Fennis et al. |
| 2014/0066536 A1 | 3/2014 | Adkins et al. |
| 2014/0275471 A1 | 9/2014 | Adkins et al. |

FOREIGN PATENT DOCUMENTS

| | | |
|---|---|---|
| WO | 2011/107367 A1 | 9/2011 |
| WO | 2011/110484 A1 | 9/2011 |

*Primary Examiner* — David J Buttner
(74) *Attorney, Agent, or Firm* — N. Denise Brown

(57) ABSTRACT

This invention relates to a process for preparing a stable low viscosity polymer polyol having a solids content of at least about 30% by weight. This process comprise free-radically polymerizing one or more base polyols, one or more preformed stabilizers, and one or more ethylenically unsaturated monomers in the presence of one or more free-radical polymerization initiators, and one or more polymer control agents; in which the process is restarted after being stopped by (I) restarting the feed of base polyol and the initiator; (II) continuing the base polyol and initiator feed until the total feed amounts to at least 5% of the total reactor volume; and (III) restarting the feed of the ethylenically unsaturated monomers in which the ratio of monomers to total feed is ramped up to its final value over a period of not less than 25% of the reactor residence time. This process is particularly suitable for restarting the process of production after any planned or unplanned reactor shutdown.

18 Claims, No Drawings

POLYMER POLYOL QUALITY

FIELD OF INVENTION

This invention relates to a process for improving the quality of polymer polyols.

Polymer polyol (PMPO) production units will occasionally experience unplanned shutdowns due to process upsets or equipment failure. If the shutdown is of short duration, the production unit can be restarted instead of completely purging the unit and losing the raw materials already charged. When restarting the production unit, feeding and/or reintroducing the monomer mixture feed stream into the process too quickly results in a polymer polyol product which exhibits poor filtration behavior.

A need exists for an improved process to restart polymer polyol production units after a shutdown or equipment failure which does not require the production unit to be purged of its contents.

SUMMARY OF THE INVENTION

This invention relates to a process for improving the quality of polymer polyols. This process comprises (1) free-radical polymerization of (A) one or more base polyols, (B) one or more pre-formed stabilizers, and (C) one or more ethylenically unsaturated monomers; in the presence of (D) one or more free-radical polymerization initiators; and optionally (E) one or more polymer control agents; wherein the process is restarted after being stopped by (I) restarting the feed of said one or more base polyols and said one or more initiators, with (a) said one or more base polyols and said one or more initiators being restarted simultaneously or (b) the feed of said one or more base polyols started first, followed by the feed of said one or more initiators, (II) continuing the polyol and initiator feed until the total feed amounts to at least 5% of the reactor volume; and (III) restarting the feed of said one or more ethylenically unsaturated monomers wherein the ratio of monomers to total feed is ramped up to its final value over a period of not less than 25% of the reactor residence time.

In situations which require the production unit to be restarted, it has been found to be advantageous to restart the unit by (I) restarting the feed of the one or more base polyols and the one or more initiators, with (a) the feed of the one or more base polyols and the one or more initiators being restarted simultaneously, or (b) the feed of the one or more base polyols being started first, followed by the feed of the one or more initiators, (II) continuing the polyol and initiator feed amounts to at least 5% of the reactor volume, and (III) restarting the feed of said one or more ethylenically unsaturated monomers wherein the ratio of monomers to total feed is ramped up to its final value over a period of not less than 25% of the reactor residence time. This process allows the components which are present in the reactor to more easily reach steady state conditions, thereby minimizing the chances of unusually high polymer fouling which may cause unexpected reactor shutdowns. In addition, bringing the monomer feed online via a controlled ramp improves the final product quality compared to product quality in a restart wherein the monomer is fed with no ramp.

DETAILED DESCRIPTION OF THE INVENTION

The present invention will now be described for purposes of illustration and not limitation. Except in the operating examples, or where otherwise indicated, all numerical parameters are to be understood as being prefaced and modified in all instances by the term "about", in which the numerical parameters possess the inherent variability characteristic of the underlying measurement techniques used to determine the numerical value of the parameter. Examples of such numerical parameters include, but are not limited to OH numbers, equivalent and/or molecular weights, functionalities, amounts, percentages, etc. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited herein is intended to include all sub-ranges subsumed within the recited range. For example, a range of "1 to 10" is intended to include all sub-ranges between (and including) the recited minimum value of 1 and the recited maximum value of 10, that is, having a minimum value equal to or greater than 1 and a maximum value equal to or less than 10. All end points of any range are included unless specified otherwise. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are inherently described in this specification such that amending to expressly recite any such sub-ranges would comply with the requirements of 35 U.S.C. § 112 and 35 U.S.C. § 132(a).

The grammatical articles "a", "an", and "the", as used herein, are intended to include "at least one" or "one or more", unless otherwise indicated, even if "at least one" or "one or more" is used in certain instances. By way of example, and without limitation, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

Equivalent weights and molecular weights given herein in Daltons (Da) are number average equivalent weights and number average molecular weights respectively, unless indicated otherwise. Permeability is given here in darcys (D). Flow rate is given herein in $kg/m^2 \cdot h$.

The term "monomer" means the simple unpolymerized form of a chemical compound having relatively low molecular weight, e.g., acrylonitrile, styrene, methyl methacrylate, and the like.

The phrase "polymerizable ethylenically unsaturated monomer" means a monomer containing ethylenic unsaturation (>C=C<, i.e. two double bonded carbon atoms) that is capable of undergoing free radically induced addition polymerization reactions.

The term pre-formed stabilizer is defined as an intermediate obtained by reacting a macromer containing reactive unsaturation (e.g. acrylate, methacrylate, maleate, etc.) with one or more monomers (i.e. acrylonitrile, styrene, methyl methacrylate, etc.), with and at least one free radical initiator, in the presence of a polymer control agent (PCA) and, optionally, in a diluent, to give a co-polymer (i.e. a dispersion having e.g. a low solids content (e.g. <30%), or soluble grafts, etc.).

The term "stability" means the ability of a material to maintain a stable form such as the ability to stay in solution or in suspension. Polymer polyols having good stability generally also have good filterability.

The phrase "polymer polyol" refers to such compositions which can be produced by polymerizing one or more ethylenically unsaturated monomers dissolved or dispersed in a polyol in the presence of a free radical catalyst to form a stable dispersion of polymer particles in the polyol. These polymer polyols have the valuable property, for example, that polyurethane foams and elastomers produced therefrom exhibit higher load-bearing properties than are provided by the corresponding unmodified polyols.

As used herein "viscosity" is in millipascal-seconds (mPa·s) measured at 25° C. on an Anton Paar SVM3000 viscometer.

In accordance with the invention, suitable base polyols to be used include, for example, any type of known polyol. Among the polyols which can be employed are one or more polyols from the following classes of compositions, known to those skilled in the art of polyurethane chemistry: polyether polyols; alkylene oxide adducts of non-reducing sugars and sugar derivatives; alkylene oxide adducts of phosphorus and polyphosphorus acids; alkylene oxide adducts of polyphenols; polycarbonate polyols; the polyols from natural oils such as castor oil, and the like; alkylene oxide adducts of polyhydroxyalkanes other than those already described herein.

Suitable polyether polyols may be the so-called conventional polyether polyols prepared by basic catalysis, or the low unsaturation polyether polyols prepared by DMC catalysis. Conventional polyether polyols have unsaturation levels of about 0.01 meq/g or higher, and low unsaturation polyether polyols may have unsaturation levels ranging from between about 0.001 to about 0.01 meq/gram.

Suitable polyether polyols include those having a functionality of at least about 2, or at least about 2.5, or at least about 3. The functionality of suitable polyether polyols is less than or equal to about 8, or less than or equal to about 6, or less than or equal to about 5. The suitable polyether polyols may also have functionalities ranging between any combination of these upper and lower values, inclusive, such as, for example, from at least about 2 to less than or equal to about 8 or less, or from at least about 2.5 to less than or equal to about 6, or from at least about 3 to less than or equal to about 5. The OH numbers of suitable polyether polyols is at least about 10, or at least about 15, or at least about 20. Polyether polyols typically also have OH numbers of less than or equal to about 180, or less than or equal to about 130, or less than or equal to about 75. The suitable polyether polyols may also have OH numbers ranging between any combination of these upper and lower values, inclusive, such as, for example, in the range of at least about 10 to about less than or equal to 180, or of at least about 15 to less than or equal to about 130, or of at least about 20 to less than or equal to about 75. The (number average) molecular weights of suitable polyether polyols is typically at least about 600, or at least about 2,000, or at least about 3,000. Polyether polyols typically have (number average) molecular weights of less than or equal to about 15,000, or less than or equal to 12,000, or less than or equal to 8,000. The suitable polyether polyols may also have (number average) molecular weights ranging between any combination of these upper and lower values, inclusive, such as, for example, of at least about 600 to less than or equal to about 15,000, or of at least about 2,000 to less than or equal to about 12,000, or of at least about 3,000 to less than or equal to about 8,000.

As used herein, the hydroxyl number is defined as the number of milligrams of potassium hydroxide required for the complete hydrolysis of the fully phthalylated derivative prepared from 1 gram of polyol. The hydroxyl number can also be defined by the equation:

$$OH=(56.1\times1000\times f)/\text{mol. wt.}$$

wherein:
OH: represents the hydroxyl number of the polyol,
f: represents the functionality of the polyol, i.e. the average number of hydroxyl groups per molecule of polyol, and
mol. wt. represents the molecular weight of the polyol.

Examples of such compounds include polyoxyethylene glycols, triols, tetrols and higher functionality polyols, polyoxypropylene glycols, triols, tetrols and higher functionality polyols, mixtures thereof, etc. When mixtures as used, the ethylene oxide and propylene oxide may be added simultaneously or sequentially to provide internal blocks, terminal blocks or random distribution of the oxyethylene groups and/or oxypropylene groups in the polyether polyol. The resultant polyols can be either ethylene oxide terminated (i.e. high primary hydroxyls) or propylene oxide terminated (i.e. high secondary hydroxyls). Suitable starters or initiators for these compounds include, for example, ethylene glycol, propylene glycol, diethylene glycol, dipropylene glycol, tripropylene glycol, trimethyolpropane, glycerol, pentaerythritol, sorbitol, sucrose, ethylenediamine, toluene diamine, etc. By alkoxylation of the starter, a suitable polyether polyol for the base polyol component can be formed. The alkoxylation reaction may be catalyzed using any conventional catalyst including, for example, potassium hydroxide (KOH) or a double metal cyanide (DMC) catalyst.

Other suitable polyols for the base polyol of the present invention include alkylene oxide adducts of non-reducing sugars and sugar derivatives, alkylene oxide adducts of phosphorus and polyphosphorus acids, alkylene oxide adducts of polyphenols, polyols prepared from natural oils such as, for example, castor oil, etc., and alkylene oxide adducts of polyhydroxyalkanes other than those described above.

Illustrative alkylene oxide adducts of polyhydroxyalkanes include, for example, alkylene oxide adducts of 1,3-dihydroxypropane, 1,3-dihydroxybutane, 1,4-dihydroxybutane, 1,4-, 1,5- and 1,6-dihydroxyhexane, 1,2-, 1,3-, 1,4-1,6- and 1,8-dihydroxyoctane, 1,10-dihydroxydecane, glycerol, 1,2,4-trihydroxybutane, 1,2,6-trihydroxyhexane, 1,1,1-trimethylolethane, 1,1,1-trimethylolpropane, pentaerythritol, caprolactone, polycaprolactone, xylitol, arabitol, sorbitol, mannitol, and the like.

Other polyols which can be employed include the alkylene oxide adducts of non-reducing sugars, wherein the alkoxides have from 2 to 4 carbon atoms. Non-reducing sugars and sugar derivatives include sucrose, alkyl glycosides such as methyl glycoside, ethyl glucoside, etc. glycol glucosides such as ethylene glycol glycoside, propylene glycol glucoside, glycerol glucoside, 1,2,6-hexanetriol glucoside, etc. as well as alkylene oxide adducts of the alkyl glycosides as disclosed in U.S. Pat. No. 3,073,788, the disclosure of which is herein incorporated by reference.

Other suitable polyols include the polyphenols and preferably the alkylene oxide adducts thereof wherein the alkylene oxides have from 2 to 4 carbon atoms. Among the polyphenols which are suitable include, for example bisphenol A, bisphenol F, condensation products of phenol and formaldehyde, the novolac resins, condensation products of various phenolic compounds and acrolein, including the 1,1,3-tris(hydroxyphenyl)propanes, condensation products of various phenolic compounds and glyoxal, glutaraldehyde, other dialdehydes, including the 1,1,2,2-tetrakis (hydroxyphenol)ethanes, etc.

The alkylene oxide adducts of phosphorus and polyphosphorus acid are also useful polyols. These include ethylene oxide, 1,2-epoxypropane, the epoxybutanes, 3-chloro-1,2-epoxypropane, etc. as preferred alkylene oxides. Phosphoric acid, phosphorus acid, the polyphosphoric acids such as, tripolyphosphoric acid, the polymetaphosphoric acids, etc. are desirable for use herein.

Other suitable polyols include polyether carbonate polyols. These polyether carbonate polyols can be prepared by catalytic copolymerization of carbon dioxide with one or more alkylene oxides, and optionally, an additional H-functional starter compound, in the presence of one or more catalysts. Examples of suitable polyether carbonate polyols and processes of preparing them are described in, for example, U.S. Pat. Nos. 7,977,501, 8,134,022, 8,933,192, 8,946,466, 9,045,592, 9,062,156, 9,080,010, 9,228,054, 9,260,562, 9,273,183, 9,309,356, 9,315,622, 9,382,417, etc., the disclosures of which are herein incorporated by reference.

It should also be appreciated that blends or mixtures of various useful polyols may be used if desired. With polyols other than the preferred type, useful monomer contents and monomer or monomers may vary somewhat. Similarly, it may be desirable or even necessary to modify the stabilizer of this invention when such other polyols are used. This can be accomplished by following the criteria discussed hereinafter in connection with the stabilizers used for the preferred polyols.

Suitable preformed stabilizers for the present invention are preformed stabilizers which are known in the art and include without limitation those described in the references discussed herein. Preferred preformed stabilizers include those discussed in, for example, U.S. Pat. Nos. 4,148,840, 5,196,476, 5,364,906, 5,990,185, 6,013,731, and 6,455,603, the disclosures of which are herein incorporated by reference.

Suitable preformed stabilizers herein include those so-called intermediate obtained by reacting a macromolecule with one or more monomers (i.e. acrylonitrile, styrene, methyl methacrylate, etc.), to give a copolymer (dispersion having a low solids content, e.g. <25% or soluble grafts, etc.). The macromolecule may be obtained by linkage of polyether polyols through coupling with a material such as a polyisocyanate, epoxy resin, etc. or by other means to produce a high molecular weight polyol. The macromolecule preferably contains reactive unsaturation and is, in general, prepared by the reaction of the selected reactive unsaturated compound with a polyol. The terminology "reactive unsaturated compound," refers to any compound capable of forming an adduct with a polyol, either directly or indirectly, and having carbon-to-carbon double bonds which are adequately reactive with the particular monomer system being utilized. More specifically, compounds containing alpha, beta unsaturation are preferred. Suitable compounds which satisfy this criteria include, for example, the maleates, fumarates, acrylates, and methacrylates. While not alpha, beta unsaturated compounds, polyol adducts formed from substituted vinyl benzenes, such as chloromethylstyrene, likewise may be utilized. Illustrative examples of suitable alpha, beta unsaturated compounds which may be employed to form the precursor stabilizer include maleic anhydride, fumaric acid, dialkyl fumarates, dialkyl maleates, glycol maleates, glycol fumarates, isocyanatoethyl methacrylate, 1,1-dimethyl-m-isopropenylbenzyl-isocyanate, methyl methacrylate, hydroxyethyl methacrylate, acrylic and methacrylic acid and their anhydride, methacroyl chloride and glycidyl methacrylate. The level of ethylenic unsaturation in the precursor stabilizer may vary widely. The minimum and maximum levels of unsaturation both are constricted by the dispersion stability that the precursor stabilizer is capable of imparting to the polymer polyol composition. The specific level of unsaturation utilized further will depend on the molecular weight and functionality of the polyol used to prepare the precursor stabilizer. Optionally, a diluent, polymer control agent or chain transfer agent molecular weight regulator may be present.

Suitable preformed stabilizers for the present invention also include those which comprise the free radical polymerization product of (1) a free radically polymerizable ethylenically unsaturated monomer and (2) an adduct of a alcohol having the average formula:

A(OROX)$_{\geq 1}$ wherein A is a polyvalent organic moiety, the free valence of which is ≥1, R is the divalent residue comprising an alkylene oxide moiety, and X is one or more of an organic moiety containing reactive unsaturation, copolymerizable with (A), and hydrogen, about one of such X is the organic moiety containing reactive unsaturation and the remaining X's are hydrogen, in which the adduct may be further adducted with an organic polyisocyanate.

Other suitable preformed stabilizers include those which are prepared using as precursor stabilizers compounds obtained by reacting a silicon atom containing compound corresponding to one or the formulas:

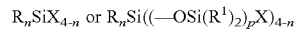

$R_nSiX_{4-n}$ or $R_nSi((-OSi(R^1)_2)_pX)_{4-n}$ wherein:
   each R: independently represent saturated or unsaturated hydrocarbyl groups, with at least one R group being an olefinically unsaturated hydrocarbyl group,
   R1: represents a hydrocarbyl group,
   X: represents a $C_1$ to $C_{10}$ alkoxy group,
   n: represents an integer from 1 to 3,
   and
   p: is an integer greater than zero;
with a polyether polyol having an average molecular weight in excess of 400 and a hydroxyl number in the range of 20 to 280. Of these, the preferred precursor stabilizers are the reaction products of vinyltrimethoxysilane, vinyltriethoxysilane or vinyltripropoxysilane with a polyether polyol having an average molecular weight in excess of 400 and a hydroxyl number in the range of 20 to 280. Such precursor stabilizers are described in U.S. Pat. No. 4,883,832, the disclosure of which is herein incorporated by reference.

Among the preferred preformed stabilizers are those which are described in, for example, U.S. Pat. No. 5,990,185, the disclosure of which is herein incorporated by reference, wherein a PFS is prepared by reacting a polyol, a precursor stabilizer, a monomer and a free-radical polymerization initiator to a reaction zone maintained at a temperature sufficient to initiate free radical polymerization, and under sufficient pressure to maintain only liquid phases in the reaction zone, for a period of time sufficient to react essentially all of the precursor stabilizer and recovering a heterogeneous mixture containing the preformed stabilizer composition.

The preformed stabilizer of the invention is derived from the following composition, comprising:
(1) a macromolecule, macromer or other suitable precursor stabilizer;
(2) a free radically polymerizable ethylenically unsaturated monomer, preferably acrylonitrile and at least one other ethylenically unsaturated comonomer copolymerizable therewith;
(3) a free radical polymerization initiator;
(4) optionally, a polymer control agent in which (1), (2), and (3) are soluble, but in which the resultant preformed stabilizer is essentially insoluble;
and/or
(5) optionally, one or more polyols.

As described in, for example, U.S. Pat. No. 5,196,476, the disclosure of which is herein incorporated by reference, suitable preformed stabilizers can be prepared by reacting a combination of components (1), (2), (3), and, optionally (4) and/or optionally (5), above, in a reaction zone maintained at a temperature sufficient to initiate a free radical reaction, and under sufficient pressure to maintain only liquid phases in the reaction zone, for a sufficient period of time to react (1), (2) and (3); and recovering a mixture containing the preformed stabilizer dispersed in the polymer control agent.

Suitable compounds to be used as the macromolecule, the macromer or the precursor stabilizer (i.e. component (1) above) include, for example, compounds which contain reactive unsaturation (e.g. acrylate, methacrylate, maleate, fumarate, isopropenylphenyl, vinyl silyl, etc.), obtained by reacting compounds containing reactive unsaturation with alcohols having the average formula $A(OROX)_{\geq 1}$. Illustrative examples include those polyols previously disclosed as suitable for base polyol (A). Examples of unsaturation containing compounds include but are not limited to, maleic anhydride, fumaric acid, dialkyl fumarates, dialkyl maleates, glycol maleates, glycol fumarates, isocyanatoethyl methacrylate, methyl methacrylate, hydroxyethyl methacrylate, acrylic and methacrylic acid and their anhydride, methacroyl chloride, and glycidyl methacrylate, vinylmethoxysilane, etc.

The reactive unsaturated compound may also be the reaction product of one or more molecules resulting in a structure with the desired qualities of a reactive unsaturated compound. For example, hydroxymethyl or hydroxyethyl methacrylate can be reacted with a polyol by way of coupling through use of an organic polyisocyanate as described in, for example, U.S. Pat. No. 4,521,546, the disclosure of which is herein incorporated by reference, or by reaction with an unsaturated mono-isocyanate such as, for example, 1,1-dimethyl-m-isopropenylbenzyl isocyanate, etc.

Suitable compounds to be used component (2) above, include reactive unsaturated compounds, particularly those that are free radically polymerizable. Some examples of suitable compounds include aliphatic conjugated dienes such as butadiene and isoprene; monovinylidene aromatic monomers such as styrene, α-methylstyrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable to be employed in making the pre-formed stabilizer. Of the above monomers, the monovinylidene aromatic monomers, such as styrene, and the ethylenically unsaturated nitriles, such as acrylonitrile are preferred.

It is preferred that (2) is acrylonitrile and at least one other ethylenically unsaturated comonomer copolymerizable with acrylonitrile. Illustrations of ethylenically unsaturated comonomer copolymerizable with acrylonitrile include styrene and its derivatives, acrylates, methacrylates such as methyl methacrylate, vinylidene chloride, and the like.

It is particularly preferred to utilize acrylonitrile with a comonomer and to maintain a minimum of about 5, or a minimum of about 15 percent by weight acrylonitrile in the system. Styrene will generally be preferred as the comonomer, but methyl methacrylate or other monomers may be employed in place of part or all of the styrene. A suitable monomer mixture (2) used to make the preformed stabilizer composition (B) comprises mixtures of acrylonitrile and styrene. The minimum weight proportion of acrylonitrile in the comonomer mixture is typically at least about 20, or at least about 25, or at least about 30 weight percent of the comonomer mixture. The maximum weight proportion of acrylonitrile in the comonomer mixture is typically less than or equal to about 80, or less than or equal to about 60, or less than or equal to about 55 weight percent of the comonomer mixture. The weight percent of acrylonitrile in the comonomer mixture can range between any combination of these upper and lower values, inclusive, such as, for example, from at least about 20 to less than or equal to about 80 weight percent, or from at least about 25 to less than or equal to about 60 weight percent, or from at least about 30 to less than or equal to about 55 weight percent of the comonomer mixture. The minimum weight proportion of styrene in the comomomer mixture is typically at least about 20, or at least about 40, or at least about 45 weight percent of the comonomer mixture. The maximum weight proportion of styrene in the comonomer mixture is typically less than or equal to about 80, or less than or equal to about 75, or less than or equal to about 70 weight percent of the comonomer mixture. The weight percent of styrene can range between any combination of these upper and lower values, inclusive, such as, for example, from at least about 20 to less than or equal to about 80 weight percent, or from at least about 40 to less than or equal to about 75 weight percent, of from at least about 45 to less than or equal to about 70 weight percent of the comonomer mixture.

Suitable weight ratios of acrylonitrile to styrene in the monomer mixture may vary from about 20:80, or from 25:75, or from 30:70. The acrylonitrile to styrene weight ratio in the monomer mixture may also vary from about 80:20, or from about 60:40, or from about 55:45. It is also possible for the acrylonitrile to styrene weight ratio in the monomer mixture to vary between any combination of these upper and lower ratios, such as, for example, from about 20:80 to about 80:20, or from about 25:75 to about 60:40, or from about 30:70 to about 55:45. If only two monomers are used, then the sum of the two monomers totals 100% of the monomer mixture.

The free radical polymerization initiators suitable for use as component (3) in the suitable preformed stabilizers of the present invention encompass any free radical initiator suitable for grafting of an ethylenically unsaturated polymer to a polyol. Examples of suitable free-radical polymerization initiators for the present invention include initiators such as, for example, peroxides including both alkyl and aryl hydroperoxides, persulfates, perborates, percarbonates, azo compounds, etc. Some specific examples include initiators such as hydrogen peroxide, di(t-butyl)-peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those initiators having a satisfactory half-life within the temperature ranges used to form the preformed stabilizer, i.e. the half-life should be about 25 percent or less of the residence time in the reactor at a given temperature. Representative examples of useful initiator species include t-butyl peroxy-2-ethyl-hexanoate, t-butylperpivalate, t-amyl peroctoate, 2,5-dimethyl-hexane-2,5-di-per-2-ethyl hexanoate, t-butylperneodecanoate, and t-butylperbenzoate. Useful also are the azo catalysts such as azobis-isobutyronitrile, 2,2'-azo bis-(2-methylbutyronitrile), and mixtures thereof. The preferred free radical initiators are peroxides such as tertiary butyl peroctoate.

Suitable initiator concentrations may range from at least about 0.01 and higher, or at least about 0.05% and higher, or at least about 0.1% and higher. The initiator concentration is also typically no more than about 2% by weight, or no more than about 1% by weight, or no more than about 0.3% by weight, based on the total weight of the components (i.e. 100% by weight of the combined weight of the macromer, the ethylenically unsaturated monomer, the free-radical polymerization initiator and, optionally the liquid diluent and/or the polymer control agent). The initiator concentration may range between any combination of these upper and lower values, inclusive, such as, for example, from about 0.01 to about 2% by weight, or from about 0.05 to 1% by weight, or from about 0.1% to about 0.3% by weight. Up to a certain point, increases in the initiator concentration result in increased monomer conversion and grafting; but further increases do not substantially increase conversion. Initiator concentrations which are too high can cause cross-linking in the preformed stabilizer (B). The particular initiator concentration selected will usually be an optimum value considering all factors, including costs.

In accordance with the present invention, a polymer control agent (4) in which components (1), (2), and (3) of the pre-formed stabilizer are soluble, but in which the resultant preformed stabilizer (B) is essentially insoluble, is optional. When present, this may be one polymer control agent or a mixture of polymer control agents.

Suitable compounds to be used as polymer control agents in accordance with the present invention include various mono-ols (i.e. monohydroxy alcohols), aromatic hydrocarbons, ethers, and other liquids. As long as the compound used as the polymer control agent does not adversely affect the performance of the preformed stabilizer (B), it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final polymer/polyol.

The selection of mono-ol is typically an alcohol containing at least one carbon atom, such as methanol, ethanol, n-propanol, isopropanol, n-butanol, sec-butanol, t-butanol, n-pentanol, 2-pentanol, 3-pentanol, and the like, and mixtures of the same. The preferred mono-ol is isopropanol. The concentration of polyol in the polymer control agent (4) if used, is limited to an amount below which gelling occurs in preformed stabilizer (B).

The polyol components suitable as component (5) in the present invention include typically the alkylene oxide adduct of $A(OH)_{>3}$ described above. Though the polyol used as component (5) can encompass the variety of polyols described above, including the broader class of polyols described in U.S. Pat. No. 4,242,249, at column 7, line 39 through column 9, line 10, the disclosure of which is herein incorporated by reference, it is preferred that the polyol component (5) be the same as or equivalent to the polyol used in the formation of precursor used to prepare the preformed stabilizer (PFS). Typically, the polyol need not be stripped off.

Because of the number of components, the variability of their concentration in the feed, and the variability of the operating conditions of temperature, pressure, and residence or reaction times, a substantial choice of these is possible while still achieving the benefits of the invention. Therefore, it is prudent to test particular combinations to confirm the most suitable operating mode for producing a particular final polymer polyol product.

In general, the amount of the components in the formulation, on a weight percent of the total formulation for forming preformed stabilizer (B), is as follows:

| Component of Formulation | Amount, weight % |
| --- | --- |
| 1 | about 10 to 40 |
| 2 | about 10 to 30 |
| 3 | about 0.01 to 2 |
| 4 | about 30 to 80 |
| 5 | about 0 to 40. |

Other suitable formulations for forming the preformed stabilizer (B) are as follows:

| | |
| --- | --- |
| 1: | 10 to 40, or 15 to 35; |
| 2 | 10 to 30, or 15 to 25; |
| 3 | 0.1 to 2, or 0.1 to 2, |
| 4 | 30 to 80, or 40 to 70 |
| 5 | 0 to 20, or 0.05 to 10. |

In accordance with the present invention, any combination of these upper and lower ranges can be used for the preformed stabilizer.

In the formulations proposed above for the preformed stabilizer (B), the %'s by weight of components 1, 2, 3, and optionally 4, and optionally 5, totals 100% by weight of component (B), the preformed stabilizer.

The process for producing the preformed stabilizer (B) is similar to the process for making the polymer polyol. The temperature range is not critical. Suitable temperatures may vary from about 80° C. and higher, or from about 115° C. and higher. The temperatures may also vary up to about 150° C. or less, or up to about 125° C. or less. Suitable temperatures may vary between any combination of these upper and lower ranges, inclusive, such as, for example, from about 80° C. to about 150° C., or from about 115° C. to about 125°

C. The catalyst and temperature should be selected so that the catalyst has a reasonable rate of decomposition with respect to the hold-up time in the reactor for a continuous flow reactor or the feed time for a semi-batch reactor.

The mixing conditions employed are those obtained using a back mixed reactor (e.g. a stirred flask or stirred autoclave). The actual agitation rate for the reactor can vary. For instance, the power input (i.e. the Installed Specific Agitator Power) for the reactor agitator can vary between 0.01 kW/m$^3$ to 10 kW/m$^3$ or higher in order to meet the mixing requirements of the specific polymerization. The reactors of this type keep the reaction mixture relatively homogeneous and thus prevent localized high monomer to macromer ratios such as occur in tubular reactors, where all of the monomer is added at the beginning of the reactor. In addition, more efficient mixing can be obtained by the use of an optional external pump around loop on the reactor section. For instance, a stream of reactor contents may be removed from the reactor bottom via external piping and returned to the top of the reactor (or vice versa) in order to enhance internal mixing of the components. This external loop may contain a heat exchanger if desired. The residence time within the external loop (which optionally contains a heat exchanger) and the turnover rate of the reactor can vary to meet the specific requirements of the polymerization conditions. For instance, at a 60 minute reactor residence time, the external loop could have a residence time of 15 seconds and a reactor turnover time of less than 30 seconds. It may, however, be desirable to change the external loop residence time and reactor turnover rate if the reactor residence time changes. In one embodiment, the external loop with an optional heat exchanger may have a recirculation rate of at least 5 seconds, or of at least 10 seconds. The recirculation rate of the external loop with an optional heat exchanger may also be 60 seconds or less, or 30 seconds or less. The external loop with optional heat exchanger may have a recirculation rate between any combination of these upper and lower ranges, inclusive, such as, for example of at least 5 seconds to 60 seconds or less, or of at least 10 seconds to 30 seconds or less.

The preformed stabilizer (B) of the present invention comprise dispersions in the diluent and any unreacted monomer in which the preformed stabilizer (B) is probably present as individual molecules or as groups of molecules in "micelles," or on the surface of small polymer particles.

Suitable compounds to be used as the ethylenically unsaturated monomers, i.e. component (C) the present invention include, for example, those ethylenically unsaturated monomers described above with respect to the preformed stabilizer. Suitable monomers include, for example, aliphatic conjugated dienes such as butadiene and isoprene; monovinylidene aromatic monomers such as styrene, α-methyl-styrene, (t-butyl)styrene, chlorostyrene, cyanostyrene and bromostyrene; α,β-ethylenically unsaturated carboxylic acids and esters thereof such as acrylic acid, methacrylic acid, methyl methacrylate, ethyl acrylate, 2-hydroxyethyl acrylate, butyl acrylate, itaconic acid, maleic anhydride and the like; α,β-ethylenically unsaturated nitriles and amides such as acrylonitrile, methacrylonitrile, acrylamide, methacrylamide, N,N-dimethyl acrylamide, N-(dimethylaminomethyl)acrylamide and the like; vinyl esters such as vinyl acetate; vinyl ethers, vinyl ketones, vinyl and vinylidene halides as well as a wide variety of other ethylenically unsaturated materials which are copolymerizable with the aforementioned monomeric adduct or reactive monomer. It is understood that mixtures of two or more of the aforementioned monomers are also suitable employed in making the pre-formed stabilizer. Of the above monomers, the monovinylidene aromatic monomers, particularly styrene, and the ethylenically unsaturated nitriles, particularly acrylonitrile are preferred. In accordance with this aspect of the present invention, it is preferred that these ethylenically unsaturated monomers include styrene and its derivatives, acrylonitrile, methyl acrylate, methyl methacrylate, vinylidene chloride, with styrene and acrylonitrile being particularly preferred monomers.

It is preferred that styrene and acrylonitrile are used in sufficient amounts such that the weight ratio of styrene to acrylonitrile (S:AN) is from about 80:20 to 20:80, more preferably from about 75:25 to 25:75. These ratios are suitable for polymer polyols and the processes of preparing them, regardless of whether they comprise the ethylenically unsaturated macromers or the pre-formed stabilizers of the present invention.

Overall, the quantity of ethylenically unsaturated monomer(s) present in the polymer polyols is typically at least about 30% by weight, or at least about 40% by weight, or at least about 45% by weight, based on 100% by weight of the polymer polyol. The quantity of ethylenically unsaturated monomer(s) present in the polymer polyols is typically about 65% by weight or less, or about 60% by weight or less, or about 58% by weight or less. The polymer polyols of the present invention typically has a solids content ranging between any combination of these upper and lower values, inclusive, e.g. from 30% to 65% by weight, or from 35% to 60% by weight, or from 45% to 58% by weight, based on the total weight of the polymer polyol.

Suitable free-radical initiators to be used as component (D) in the present invention include, for example, those as described previously for the formation of the preformed stabilizers. Examples of suitable free-radical polymerization initiators for the present invention include initiators such as, for example, peroxides including both alkyl and aryl hydroperoxides, peresters, persulfates, perborates, percarbonates, azo compounds, etc. Some specific examples include catalysts such as hydrogen peroxide, di(t-butyl)peroxide, t-butylperoxy diethyl acetate, t-butyl peroctoate, t-butyl peroxy isobutyrate, t-butyl peroxy 3,5,5-trimethyl hexanoate, t-butyl perbenzoate, t-butyl peroxy pivalate, t-amyl peroxy pivalate, t-butyl peroxy-2-ethyl hexanoate, lauroyl peroxide, cumene hydroperoxide, t-butyl hydroperoxide, azobis(isobutyronitrile), 2,2'-azo bis-(2-methylbutyronitrile), etc.

Useful initiators also include, for example, those initiators having a satisfactory half-life within the temperature ranges used in forming the polymer polyol. Typically, the half-life of the initiator should be about 25% or less of the residence time in the reactor at any given time. Preferred initiators for this portion of the invention include acyl peroxides such as didecanoyl peroxide and dilauroyl peroxide, alkyl peroxides such as t-butyl peroxy-2-ethylhexanoate, t-butylperpivalate, t-amyl peroxy pivalate, t-amyl peroctoate, 2,5-dimethylhexane-2,5-di-per-2-ethyl hexanoate, t-butyl perneodecanoate, t-butylperbenzoate and 1,1-dimethyl-3-hydroxybutyl peroxy-2-ethylhexanoate, and azo catalysts such as azobis (isobutyronitrile), 2,2'-azo bis-(2-methoxyl-butyronitrile), and mixtures thereof. Most preferred are the acyl peroxides described above and the azo initiators.

The quantity of free-radical initiator used herein can be varied within wide limits. In general, the amount of initiator ranges from about 0.01 to about 2% by weight, based on 100% by weight of the final polymer polyol. Increases in catalyst concentration result in increases in monomer conversion up to a certain point, but past this, further increases do not result in substantial increases in conversion. The particular catalyst concentration selected will usually be an optimum value, taking all factors into consideration including costs.

Suitable polymer control agents for use as component (E) in the present invention include, for example, those known to be useful in polymer polyols and the processes of preparing polyols such as those described in, for example, U.S. Pat. Nos. 3,953,393, 4,119,586, 4,463,107, 5,324,774, 5,814,699 and 6,624,209, the disclosures of which are herein incorporated by reference. Some examples of suitable compounds to be used as polymer control agents include various mono-ols (i.e. monohydroxy alcohols), aromatic hydrocarbons, ethers, and other liquids.

Polymer control agents are also commonly referred to as reaction moderators. These are known to control the molecular weight of the polymer polyol. As long as the compound used as the polymer control agent does not adversely affect the performance of the polymer polyol, it is suitable for use in the practice of the invention. Preferred are the mono-ols because of their ease of stripping from the final polymer/polyol composition. Mixtures of one or more mono-ols may be used as polymer control agents. The choice of mono-ol is not narrowly critical. It should not form two phases at reaction conditions and should be readily stripped from the final polymer/polyol.

Suitable polymer control agents include, for example, one or more mono-ol which is typically an alcohol containing at least one carbon atom, such as methanol, ethanol, n-propanol, isopropanol, n-butanol, sec-butanol, t-butanol, n-pentanol, 2-pentanol, 3-pentanol, allyl alcohol, and the like, and mixtures of the same. The preferred mono-ol is isopropanol. Other known polymer control agents include compounds such as, for example, ethylbenzene and toluene. In accordance with the present invention, the most preferred polymer control agents include isopropanol, ethanol, tert-butanol, toluene, ethylbenzene, etc.

Polymer control agents can be used in substantially pure form (i.e. as commercially available) or can be recovered in crude form from the polymer polyol process and reused as-is. For instance, if the polymer control agent is isopropanol, it can be recovered from the polymer polyol process and used at any point in a subsequent product campaign in which the isopropanol is present (i.e. such as the production of PFS A and PFS B in Table 1 of U.S. Pat. No. 7,179,882, the disclosure of which is hereby incorporated by reference). The amount of crude polymer control agent in the total polymer control agent can range anywhere from 0% up to 100% by weight.

The total amount of polymer control agent (PCA) present in the polymer polyols of the present invention is typically greater than or equal to about 3.0%, or greater than or equal to about 3.5%, greater than or equal to about 4.0%, or greater than or equal to about 5.0% by weight, based on the total weight of the polymer polyol. The amount of polymer control agent also typically is less than or equal to about 20%, or less than or equal to about 15%, or less than or equal to about 10% by weight, or less than or equal to about 7% by weight, based on the total weight of the polymer polyol. Suitable concentrations for the polymer control agent (PCA) may vary between any combination of these upper and lower values, inclusive, such as, for example, from at least about 3.0% up to about 20%, or from at least about 3.5% to 15% or less, or from 4.0% up to about 10%, or from at least about 5 up to about 7% by weight, based on the total weight of the polymer polyol.

In accordance with the process herein, the process in the product unit can be restarted after being stopped by (I) restarting the feed of the one or more base polyols and of the one or more initiators, wherein (a) the feed of the base polyol component and the initiator component are restarted simultaneously, or (b) the feed of the base polyol component is restarted first, and then the feed of the initiator component is restarted; (II) continuing to feed the base polyol component and the initiator component until the total feed amounts to at least 5% of the reactor volume; and (III) restarting the feed of the one or more ethylenically unsaturated monomers wherein the ratio of the ethylenically unsaturated monomer to total feed is ramped up to its final value over a period of not less than 25% of the reactor residence time.

In accordance with the invention, the base polyol component and the initiator component may be separate feed streams or a single feed stream. If there is only one feed stream comprising the base polyol component and the initiator component, then the feed of the base polyol component and initiator component will be restarted simultaneously. If the base polyol component is one feed stream and the initiator component is a separate feed stream, the present invention allows for these two feed streams to either be (i) restarted simultaneously, or (ii) the base polyol feed stream is restarted, and then the initiator feed stream is restarted.

In accordance with the invention, the feed of the at least one ethylenically unsaturated monomer is restarted once or after at least about 5% of the total reactor volume contains base polyol and initiator. For purposes of the invention, the time period after restarting the polyol feed or polyol/initiator feed until the one or more monomer feeds is restarted can be described by the formula:

$$Z = [(RT/\% \, P) \times 5\%]$$

wherein:
Z represents the time period after restarting the polyol feed or the polyol/initiator feed until the feed of one or more ethylenically unsaturated monomer is restarted,
RT represents the residence time of the first reactor, and
% P represents the wt % base polyol in the final product.
By way of example, to restart the reactor when preparing a 45% by weight solids polymer polyol with a 60 minute residence time, the monomer feed is restarted by solving for Z in the formula:

$$Z = [(60 \text{ minutes}/55\%) \times 5\%]$$

$$5.5 \text{ minutes} = [(60 \text{ minutes}/55\%) \times 5\%]$$

Thus, the feed of one or more ethylenically unsaturated monomers is restarted 5.5 minutes after the polyol feed or the polyol/initiator feed is restarted when operating under these conditions.

The ratio of the ethylenically unsaturated monomers to total feed is ramped up to its final value over a period of not less than 25% of the reactor residence time, or of not less than 30% of the reactor residence time, or of not less than 35% of the reactor residence time.

The present invention can be used to restart the reactor after a shutdown (planned or unplanned) or a stoppage of virtually any sort. Typically, the process herein is suitable for restarting the reactor after it has been shutdown for at least one minute, or for at least two minutes, or for at least 5 minutes.

Certain embodiments of the present invention, therefore, are directed to a process for preparing a stable, low viscosity polymer polyol having a solids content of at least about 30% by weight, based on the total weight of the polymer polyol, comprising (1) free-radically polymerizing (A) one or more base polyols; (B) one or more pre-formed stabilizers; and (C) one or more ethylenically unsaturated monomers; in the presence of (D) one or more free-radical polymerization initiators; and, optionally, (E) one or more polymer control agents; wherein the process is restarted after being stopped by (I) restarting the feed of said one or more base polyols and said one or more initiators, in which (a) the feed of said one or more base polyols and said one or more initiators is restarted simultaneously or (b) the feed of said one or more base polyols is restarted first, followed by restarting the feed of said one or more initiators; (II) continuing the polyol and initiator feed or feeds until the total feed amounts to at least 5% of the total reactor volume; and (III) restarting the feed of said one or more ethylenically unsaturated monomers wherein the ratio of monomers to total feed is ramped up to its final value over a period of not less than 25% of the reactor residence time.

In certain embodiments, the invention is directed to the process of preparing a stable, low viscosity polymer polyol of the previous paragraph, wherein (b) the feed of said one or more base polyols is restarted first, and then the feed of said one or more initiators is restarted.

In certain embodiments, the invention is directed to the process of preparing a stable, low viscosity polymer polyol of the previous two paragraphs, wherein (a) the feed of said one or more base polyols and of said one or more initiators is restarted simultaneously.

In certain embodiments, the invention is directed to the process of preparing a stable, low viscosity polymer polyol of the previous three paragraphs, wherein the feed of said one or more base polyols is a separate feed stream than the feed of same one or more initiators.

In certain embodiments, the invention is directed to the process of preparing a stable, low viscosity polymer polyol of the previous four paragraphs, wherein the feed of said one or more base polyols and of said one or more initiators are one feed stream.

In certain embodiments, the invention is directed to the process of preparing a stable, low viscosity polymer polyol of the previous five paragraphs, wherein the time period after restarting the polyol feed or polyol/initiator feed until the feed of one or more ethylenically unsaturated monomers is restarted is determined by the formula: $Z=[(RT/\%P)\times 5\%]$ wherein: Z represents the time period after restarting the polyol feed or the polyol/initiator feed until the ethylenically unsaturated monomer feed is restarted; RT represents the first reactor residence time; and % P represents the wt % base polyol in the final product; in which 5% represents the minimum reactor volume required before restarting the feed of the one or more ethylenically unsaturated monomers.

In certain embodiments, the invention is directed to the process of preparing a stable, low viscosity polymer polyol of the previous six paragraphs, wherein the ratio of monomers to total feed is ramped up gradually.

In certain embodiments, the invention is directed to the process of preparing a stable, low viscosity polymer polyol of the previous seven paragraphs, wherein the ratio of monomers to total feed is ramped up to its final value over a period of not less than 25% of the reactor residence time.

In certain embodiments, the invention is directed to the process of preparing a stable, low viscosity polymer polyol of the previous eight paragraphs, wherein (A) said one or more base polyols comprises one or more polyether polyols prepared by DMC catalysis characterized by a unsaturation of about 0.01 meq/g or less.

In certain embodiments, the invention is directed to the process of preparing a stable, low viscosity polymer polyol of the previous nine paragraphs, wherein (A) said one or more base polyols comprises one or more polyether polyols having a functionality of about 2 to about 8 and an OH number of about 10 to about 180.

In certain embodiments, the invention is directed to the process of preparing a stable, low viscosity polymer polyol of the previous ten paragraphs, wherein (A) said one or more base polyols comprises a polyether carbonate polyol.

In certain embodiments, the invention is directed to the process of preparing a stable, low viscosity polymer polyol of the previous eleven paragraphs, wherein (B) said pre-formed stabilizer comprises the copolymerizable reaction product of (1) a macromer, with (2) a free radially polymerizable ethylenically unsaturated monomer, in the presence of (3) a free radical initiator, and optionally, (4) a polymer control agent.

In certain embodiments, the invention is directed to the process of preparing a stable, low viscosity polymer polyol of the previous twelve paragraphs, wherein the solids content of the polymer polyols ranges from about 30% to about 60% by weight.

In certain embodiments, the invention is directed to the process of preparing a stable, low viscosity polymer polyol of the previous thirteen paragraphs, wherein (C) said one or more ethylenically unsaturated monomers comprises a mixture of styrene and acrylonitrile.

In certain embodiments, the invention is directed to the process of preparing a stable, low viscosity polymer polyol of the previous fourteen paragraphs, wherein (C) said one or more ethylenically unsaturated monomers comprises a mixture of styrene and acrylonitrile in a weight ratio of 80:20 to 20:80.

In certain embodiments, the invention is directed to the process of preparing a stable, low viscosity polymer polyol of the previous fifteen paragraphs, wherein (D) said one or more free radical initiators are selected from the group consisting of peroxides, peresters, persulfates, perborates, percarbonates, azo compounds and mixtures thereof.

In certain embodiments, the invention is directed to the process of preparing a stable, low viscosity polymer polyol of the previous sixteen paragraphs, wherein (E) one or more polymer control agents which is selected from the group consisting of monols, aromatic hydrocarbons, ethers and mixtures thereof.

In certain embodiments, the invention is directed to the process of preparing a stable, low viscosity polymer polyol of the previous seventeen paragraphs, wherein (E) said one or more polymer control agents comprises isopropanol.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

The following materials were used in the examples:

Polyol A: a sorbitol-started polyether polyol produced by reacting propylene oxide and ethylene oxide in the presence of potassium hydroxide catalyst and refining to remove the catalyst. The polyol has a hydroxyl number of 28.

Polyol B: a glycerine initiated polyether polyol produced by reacting propylene oxide and ethylene oxide in the presence of a potassium catalyst and refining to remove the catalyst. The polyol has a hydroxyl number of about 52, and a viscosity of about 520 cSt.

PCA: isopropanol, a polymer control agent

TMI: isopropenyl dimethyl benzyl isocyanate (an unsaturated aliphatic isocyanate) sold as TMI® by Allnex TAPP: tert-amyl peroxy pivalate, a free-radical polymerization initiator commercially available from Akzo Nobel under the tradename Trigonox 125-C75

TBPEH: tert-butyl peroxy-2-ethylhexanoate, a free-radical polymerization initiator, commercially available from United Initiators under the tradename TBPEH Viscosity: viscosities were measured in millipascal-seconds (mPa·s) at 25° C. on an Anton Paar SVM3000 viscometer Filtration filterability is determined by diluting one part by Hindrance weight sample (e.g. 200 grams) of polymer polyol (Filterability): with two parts by weight anhydrous isopropanol (e.g. 400 grams) to remove any viscosity-imposed limitations and using a fixed quantity of material in relative to a fixed cross-sectional area of screen (e.g 1 ⅛ in. diameter), such that all of the polymer polyol and isopropanol solutions passes by gravity through a 700-mesh screen. The 700-mesh screen is made with a Dutch twill weave. The actual screen used had a nominal opening of 30 microns. The amount of sample which passes through the screen within 600seconds is reported in percent, in which a value of 100 percent indicates that over 99 weight percent passes through the screen within 600 seconds.

Macromer A—Preparation: Macromer A was prepared by heating 100 parts of Polyol A, 2 parts of TMI, and 100 ppm of bismuth(III)neodecanoate catalyst at 75° C. for 4 hours.

Preformed Stabilizer (PFS A) Preparation:

The pre-formed stabilizer (PFS A) was prepared in a two-stage reaction system comprising a 0.5 L continuously-stirred tank reactor (CSTR) fitted with an impeller and 4 baffles (first-stage) and a plug-flow reactor (second stage). The residence time in each reactor was about 60 minutes. The reactants were pumped continuously to the reactor from feed tanks through an in-line static mixer and then through a feed tube into the reactor, which was well mixed. The temperature of the reaction mixture was controlled at 120±5° C. The product from the second-stage reactor overflowed continuously through a pressure regulator designed to control the pressure in each stage at 65 psig. The product, i.e. the pre-formed stabilizer, then passed through a cooler and into a collection vessel. The preformed stabilizer formulation is disclosed in Table 1.

TABLE 1

| Preformed Stabilizer Composition | |
|---|---|
| Component | PFS A |
| PCA type | Isopropanol |
| PCA, wt. % | 60.0% |

TABLE 1-continued

| Preformed Stabilizer Composition | |
|---|---|
| Component | PFS A |
| Macromer | Macromer A |
| Macromer, wt. % | 24.0% |
| Monomer, wt. % | 15.9% |
| Styrene/acrylonitrile ratio | 50:50 |
| TBPEH, wt. % | 0.1% |

Polymer Polyol Preparation:

This series of examples (Table 2) relates to the preparation of polymer polyols. The polymer polyols were prepared in a two-stage reaction system comprising a 0.5 L continuously-stirred tank reactor (CSTR) fitted with an impeller and 4 baffles (first-stage) and a plug-flow reactor (second stage). The residence time in each reactor was about 60 minutes. The reactants were pumped continuously from feed tanks through an in-line static mixer and then through a feed tube into the reactor, which was well mixed. The temperature of the reaction mixture was controlled at 115±5° C. The product from the second-stage reactor overflowed continuously through a pressure regulator designed to control the pressure in each stage at 45 psig. The product, i.e. the polymer polyol, then passed through a cooler and into a collection vessel. The crude product was vacuum stripped to remove volatiles. The wt. % total polymer in the product was calculated from the concentrations of residual monomers measured in the crude polymer polyol before stripping.

TABLE 2

| Formulations for Polymer Polyols at 60 minute Residence Time | | | |
|---|---|---|---|
| | Example 1 | Example 2 | Example 3 |
| Polyol B (wt. % in feed) | 45.70 | 45.70 | 45.70 |
| PFS A (wt. % in feed) | 6.25 | 6.25 | 6.25 |
| Styrene (wt. % in feed) | 31.14 | 31.14 | 31.14 |
| Acrylonitrile (wt. % in feed) | 16.67 | 16.67 | 16.67 |
| TAPP (wt. % in feed) | 0.25 | 0.25 | 0.25 |
| PCA (wt % in feed) | 3.75 | 3.75 | 3.75 |
| Total Polymer (wt. %) | 49.9 | 49.8 | 49.9 |
| Feed Interruption[1] | No | Yes | Yes |
| Polyol Feed Before Monomer Restart (min) | — | 10[2] | 10[2] |
| Monomer Ramp after Feed Interruption | — | Yes[3] | No[4] |
| Filterability - 700 mesh (s) | 212 | 367 | 550 |

[1]Feeds interrupted 5 hours into run. Idle for 5 minutes before restart.
[2]Corresponds to approximately 9% of reactor volume
[3]Monomer feed ramped to 100% over 60 minutes.
[4]Monomer feed at 100% instantaneously Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for preparing a stable, low viscosity polymer polyol having a solids content of at least about 30% by weight, based on the total weight of the polymer polyol, comprising:

(1) free-radically polymerizing:

(A) one or more base polyols;

(B) one or more pre-formed stabilizers; and (C) one or more ethylenically unsaturated monomers; in the presence of (D) one or more free-radical polymerization initiators; and, optionally, (E) one or more polymer control agents;

wherein the process is restarted after being stopped by (I) restarting the feed of said one or more base polyols and said one or more initiators, in which (a) the feed of said one or more base polyols and said one or more initiators is restarted simultaneously or (b) the feed of said one or more base polyols is restarted first, followed by restarting the feed of said one or more initiators; (II) continuing the polyol and initiator feed or feeds until the total feed amounts to at least 5% of the total reactor volume; and (III) restarting the feed of said one or more ethylenically unsaturated monomers wherein the ratio of monomers to total feed is ramped up to its final value over a period of not less than 25% of the reactor residence time.

2. The process of claim 1, wherein (b) the feed of said one or more base polyols is restarted first, and then the feed of said one or more initiators is restarted.

3. The process of claim 1, wherein (a) the feed of said one or more base polyols and of said one or more initiators is restarted simultaneously.

4. The process of claim 3, wherein the feed of said one or more base polyols is a separate feed stream than the feed of same one or more initiators.

5. The process of claim 3, wherein the feed of said one or more base polyols and of said one or more initiators are one feed stream.

6. The process of claim 1, wherein the time period after restarting the polyol feed or polyol/initiator feed until the feed of one or more ethylenically unsaturated monomers is restarted is determined by the formula:

$$Z=[(RT/\%\ P)\times 5\%]$$

wherein:

Z represents the time period after restarting the polyol feed or the polyol/initiator feed until the ethylenically unsaturated monomer feed is restarted, RT represents the residence time of the first reactor, and % P represents the wt % base polyol in the final product.

7. The process of claim 1, wherein the ratio of monomers to total feed is ramped up gradually.

8. The process of claim 1, wherein the ratio of monomers to total feed is ramped up to its final value over a period of not less than 25% of the reactor residence time.

9. The process of claim 1, wherein (A) said one or more base polyols comprises one or more polyether polyols prepared by DMC catalysis characterized by a unsaturation of about 0.01 meq/g or less.

10. The process of claim 1, wherein (A) said one or more base polyols comprises one or more polyether polyols having a functionality of about 2 to about 8 and an OH number of about 10 to about 180.

11. The process of claim 1, wherein (A) said one or more base polyols comprises a polyether carbonate polyol.

12. The process of claim 1, wherein (B) said preformed stabilizer comprises the copolymerizable reaction product of (1) a macromer, with (2) a free radially polymerizable ethylenically unsaturated monomer, in the presence of (3) a free radical initiator, and optionally, (4) a polymer control agent.

13. The process of claim 1, wherein the solids content of the polymer polyols ranges from about 30% to about 60% by weight.

14. The process of claim 1, wherein (C) said one or more ethylenically unsaturated monomers comprises a mixture of styrene and acrylonitrile.

15. The process of claim 1, wherein (C) said one or more ethylenically unsaturated monomers comprises a mixture of styrene and acrylonitrile in a weight ratio of 80:20 to 20:80.

16. The process of claim 1, wherein (D) said one or more free radical initiators are selected from the group consisting of peroxides, peresters, persulfates, perborates, percarbonates, azo compounds and mixtures thereof.

17. The process of claim 1, additionally comprising (E) one or more polymer control agents which is selected from the group consisting of monols, aromatic hydrocarbons, ethers and mixtures thereof.

18. The process of claim 1, wherein (E) said one or more polymer control agents comprises isopropanol.

* * * * *